United States Patent [19]
Cruz et al.

[11] Patent Number: 5,621,580
[45] Date of Patent: Apr. 15, 1997

[54] TERNARY CODE MAGNETIC RECORDING SYSTEM

[76] Inventors: Joao R. Cruz, R.R. #1, Box 117B-4, Norman, Okla. 73072; Daniel J. Krueger, 604 Meadowlake, Noble, Okla. 73068

[21] Appl. No.: 296,512

[22] Filed: Aug. 26, 1994

[51] Int. Cl.$^6$ ........................................ G11B 5/09
[52] U.S. Cl. ........................................ 360/48; 360/40
[58] Field of Search ........................... 360/40, 46, 48

[56] References Cited

U.S. PATENT DOCUMENTS 3,277,454  10/1966  Chao .
4,551,773  11/1985  Cohn et al. .................... 360/40

OTHER PUBLICATIONS

R. Price, J.W. Craig, H.E. Melbye, and A. Perahia, "An Experimental, Multilevel, High Density Disk Recording System," IEEE Trans. Magn., vol. 14, No. 5, pp. 315–317, Sep. 1978.

G. V. Jacoby, "Ternary 3PM Magnetic Recording Code and System," IEEE Trans. Magn., vol. 17, No. 6, pp. 3326–3328, Nov. 1981.

C.S. Chi and K.A. Frey, "Directional CRA for Ternary Digital Recording," IEEE Trans. Magn. vol. 18, No. 6, pp. 1259–1261, Nov. 1982.

C.A. French, G.S. Dixon, and J.K. Wolf, "Results Involving (d,k) Constrained M–ary Codes," IEEE Trans. Magn., vol. 23, No. 5, pp. 3678–3680, Sep. 1987.

B.D. Trumpis, "Convolutional Coding For M–ary Channels," Dissertation at University of California, Los Angeles, 1975.

*Primary Examiner*—W. C. Kim
*Attorney, Agent, or Firm*—Haynes and Boone, L.L.P.

[57] ABSTRACT

A digital magnetic recording system comprises an input for a binary-encoded data signal comprising two symbols. The binary signal is converted, using a binary-to-ternary convolutional encoder, to a ternary signal comprising three symbols. The ternary signal is recorded onto a magnetic medium wherein two symbols are recorded using conventional saturation recording and a third symbol is recorded using a nonoriented state. The nonoriented state results from the application to the medium of a high-frequency oscillating magnetic flux. The recorded signal is subsequently reproduced and equalized. A Viterbi algorithm is used to convert the equalized signal back to the original binary signal which is then output from the system.

60 Claims, 4 Drawing Sheets

```
%This is a MATLAB program that performs an exhaustive search to
%find the optimum binary-to-ternary convolutional code for a
%given constraint length.

k=input ('Desired code constraint length:');

%generate matrix I whose rows provide all necessary test inputs
tmpl=[1:2^(k-1)]'-1;
I(:,1)=once(length(tmpl),1);
for p=(k-1):-1:1
   tmp2=rem(tmp1,2^(p-1));
   I (:,p+1)=(tmp1-tmp2)/2^(p-1);
   tmp1=tmp2;
end
I(:,k+1:2*k)=zeros(length(tmpl),k);

%generate matrix G whose rows provide all possible code vectors
tmpl=[1:3^k]'-1;
for p=k:-1:1
   tmp2=rem(Lmp1,3^(p-1));
   G(:,p)=(tmp1-tmp2)/3^(p-1);
   tmp1=tmp2;
end %find the minimum dist. for each code, and count # shortest paths
dimn=ones(3^k,1)*999;
nmin=zeros(3^k,1);
for inp=1:2^(k-1)
   ham=zeros(3^k,l);
   for n=1:2*k
      sm=zeros(3^k,1);
      for p=1:min(n,k)
         sm=sm+G(:,p)*I(inp,n-p+1);
      end
      ham=ham+(rem(sm,3)~=0);
   end
   nmin=(ham<=dmin)+(nmin.*(ham>=dmin));
   dmin=(ham.*(ham<=dmin))+(dmin.*(ham>dmin));
end dminmax=max(dmin);
opt=find(dmin=dminmax);
nminmin=min(nmin(opL));
opt=find((dmin=dminmax) & (nmin=nminmin));

%print results of search
disp(['The best codes of constraint length',num2str(k),' are:'])
disp(G(opt,:))
disp('The hamming distance of these codes is:')
disp(dminmax)
disp('The number of paths at this distance is:')
disp(nminmin)
```

*Fig. 7*

TERNARY CODE MAGNETIC RECORDING SYSTEM

TECHNICAL FIELD

The present invention relates to a digital magnetic recording system and, more particularly, to encoding techniques which utilize a ternary channel for recording digital data onto magnetic media.

DESCRIPTION OF THE PRIOR ART

The advent of the information age brings an enormous demand for the storage of digital data, along with demands for the processing of such data. The density of information stored in a single system has had to increase to accommodate this growing demand. For each of the past three decades, the capacity of magnetic disk storage, for example, has grown by a factor of 10. This explosive growth has been fueled by several factors: improvements in the design of heads and disks, decreases in the disk medium particle size, decreases in the head gap length and flying height, and improvements in servo accuracy for increased track density. Mark H. Kryder, "Introduction to the Special on Issues on Magnetic Information Storage Technology", *Proceedings of the IEEE*, pp. 1475–1476, Nov. 1986.

Virtually no advances have been made though to feasibly record information on a magnetic medium using more than the two most elemental levels or types of symbols, which symbols are represented by members of the binary, or base two, alphabet {0, 1}. At least four methods have been attempted, however, to increase storage capacity by recording data using a third symbol, via a ternary channel, in which channel symbols may be represented by members of the ternary, or base three, alphabet {0, 1, 2}.

The first method for encoding information using a ternary magnetic recording channel was disclosed by R. Price et al. in "An Experimental, Multilevel, High Density Disk Recording System", *IEEE Transactions on Magnetics*, vol. mag.-14, no. 5, pp. 315–317, September 1978. Price et al. utilized an AC-bias to linearize the magnetic recording channel and wrote three-level signals to the magnetic medium. The requirement for a linearized channel limited the medium magnetization to levels well below saturation, that is, below a state in which substantially all of the molecules of at least a portion of the medium have a particular magnetic orientation. Consequently, saturation recording via a binary channel is able to provide higher signal-to-noise ratios and higher information densities for a given probability of error.

A second method for magnetically recording a ternary channel was disclosed by George V. Jacoby in "Ternary 3PM Magnetic Recording Code and System", *IEEE Transactions on Magnetics*, vol. mag.-17, no. 6, pp. 3326–3328, November 1981. Jacoby utilized two-level (binary) saturation recording with transitions spaced so as to produce three possible output waveforms: a single pulse, a doublet pulse, or an absence of a pulse. A third method to magnetically record a ternary channel was proposed by C. S. Chi and K. A. Frey in "Directional CRA for Ternary Digital Recording", IEEE Transactions on Magnetics, vol. mag.-18, no. 6, pp. 1259–1261, November 1982. Chi et al. used a continuous AC write signal. The ternary data was encoded by placing appropriate "breaks" in the AC signal. A break in the signal when it had reached its maximum value, followed shortly by a resumption of the AC signal yielded a "positive" doublet pulse. Similarly a break in the signal when it had reached its minimum value yielded a "negative" doublet, and no break in the signal yielded no doublet. The channels described by both Jacoby and Chi et al. required the use of doublets composed of the channel response to two transitions. Since the transitions must be spaced apart enough to be detectable, the size of the doublets limited the recording channel symbol density so that, compared to traditional binary saturation recording techniques, there was no net gain, or at best, a negligible net gain, in information density.

A fourth method for magnetically recording a ternary channel was described by Catherine A. French et al. in "Results Involving (D,K) Constrained M-ary Codes", *IEEE Transactions on Magnetics*, vol. mag.-23, no. 5, pp. 3678–3680, September 1987. In place of an absence of a transition, this channel used closely spaced transitions that tended to cancel out, thereby softening the normal saturation recording requirement that the detectable pulses alternate in polarity. With this requirement removed, the saturation recording channel was no longer binary (the pulse was either present or absent), but ternary (the pulse was positive, negative, or absent). This channel can be viewed as an extension of a binary channel disclosed in U.S. Pat. No. 3,227,454 to Chao in which some zeros are represented by an even number of transitions and some are represented by an odd number of transitions. This channel was not a true ternary channel since restrictions existed on the ternary sequences that could be sent through the channel (for example, at least one zero was required between pulses of the same polarity). Because the data written was dependent on the pattern of the data to be written, it was nonlinear and therefore complex to modulate. Consequently, compared to traditional binary saturation recording techniques, there was little or no practically achievable improvement in information density.

In addition to the enormous demand for information storage, it is understood that there is also a corresponding demand to minimize the probability of error of such storage. For this reason, coding may be implemented to provide for, among other things, timing recovery, the reduction of non-linearities, and error correction.

Although numerous methods are available for encoding information, virtually all magnetic storage media implement "Run-Length Limited" (RLL) codes to facilitate timing recovery and the reduction of nonlinearities. RLL codes control the maximum and minimum distances between two consecutive transitions or changes in a sequence of magnetic orientations on a magnetic medium. The maximum distance ensures that the timing algorithm in the detector receives frequent timing updates to avoid missing a symbol. Since updates only occur in the presence of a detectable symbol, such as a transition in magnetic orientations, it is necessary to guarantee that such symbols appear frequently and regularly. At high symbol densities, the minimum distance prevents transitions from getting too close to each other. When transitions get too close, their signal amplitudes are reduced and, in addition, the transitions can interact in such a way as to shift from their original positions, resulting in a nonlinear effect that increases the probability of timing errors.

The detection and correction of errors in information stored on a magnetic medium is facilitated by encoding redundancy into the information sequence. Redundancy requires, for a given quantity of information, that a certain number of additional symbols be written to the medium. To avoid a consequent decrease in the information density of the medium, the symbols must be written closer together, resulting in an increased raw error rate.

Because the information density for a given error rate is important and is affected by coding, a density measure, denoted as the code "rate," has been developed. The code rate is generally defined to be the average number of bits carried by each channel symbol. Therefore, a binary channel having two symbols represented by members of the binary alphabet {0, 1} with no coding redundancy would have a rate of one, or unity. Since coding introduces redundancy, the rate for a binary code is always less than one and is generally between 1/2 and 3/4. Some rates as high as 8/9 have been attained by compromising redundancy for information density.

An alternative method of coding utilizes convolutional techniques. B. D. Trumpis, in his 1975 dissertation at the University of California, Los Angeles, entitled "Convolutional Coding for M-ary Channels," studied the application of convolutional codes in which the code symbol alphabet is expanded to include M symbols, where M is an integer power of two. He used convolutional coding to convert from binary to "M-ary" symbols and to thereby provide the necessary redundancy while preserving a rate of unity. Since no feasible "M-ary" channel symbols have been developed for magnetic recording, the advantages of rate one convolutional coding have not yet been realized.

In view of the foregoing, what is needed is a system in which information can be encoded and stored onto a magnetic medium with a rate of at least unity and which can utilize magnetic saturation recording, which has a transition density comparable to that of a binary channel, and which can be modeled as a linear system.

SUMMARY OF THE INVENTION

The foregoing problems are solved and a technical advance is achieved by a rate one coding system incorporating saturation recording and a transition density comparable to that of a binary channel, and which further may be modeled as a linear system. In a departure from the art, a system is provided with a ternary channel and convolutional coding is employed to provide redundancy of information stored.

In a preferred embodiment, one aspect of the system comprises encoding a sequence of bits, which bits represent a first or second binary symbol. An impulse response vector is provided, where each term has a first, second, or third numerical value. The sequence is convolved with the vector, producing thereby a value which is then divided by three, yielding a remainder represented by a first, second, or third ternary symbol.

Another aspect of the system comprises recording, onto a magnetic medium, the first, second, or third ternary symbol. The first and second ternary symbols are recorded by causing the medium to have, respectively, first and second magnetically oriented states. The third symbol is recorded by causing the medium to have a substantially magnetically nonoriented state.

Another aspect of the invention comprises reproducing the recorded information from the medium. The ternary symbols are read as pulses which are detected (equalized), and then decoded from ternary symbols to the original sequence of binary symbols.

An advantage achieved with the invention is that, for a given probability of error, saturation recording may be utilized for attaining signal-to-noise ratios and information densities comparable to those attained with binary saturation recording.

A further advantage achieved with the invention is that there is no need to space channel symbols apart to allow for doublets, thereby enhancing the information storage density.

A still further advantage achieved with the invention is that the invention may be modeled as a linear system and hence information may be recovered using established linear equalization techniques which are simpler and less costly than the recovery of information using equalization techniques for nonlinear channels.

A still further advantage achieved with the invention is that rate one convolutional coding may be used to encode redundancy into the information stored onto the medium while providing the absolute minimum expansion of the code symbol alphabet.

A still further advantage achieved with the invention is that, because rate one coding is employed, information may be input to and output from the encoder and the decoder at the same rate, thereby simplifying the control of timing.

DESCRIPTION OF A PREFERRED EMBODIMENT

Figure 1:
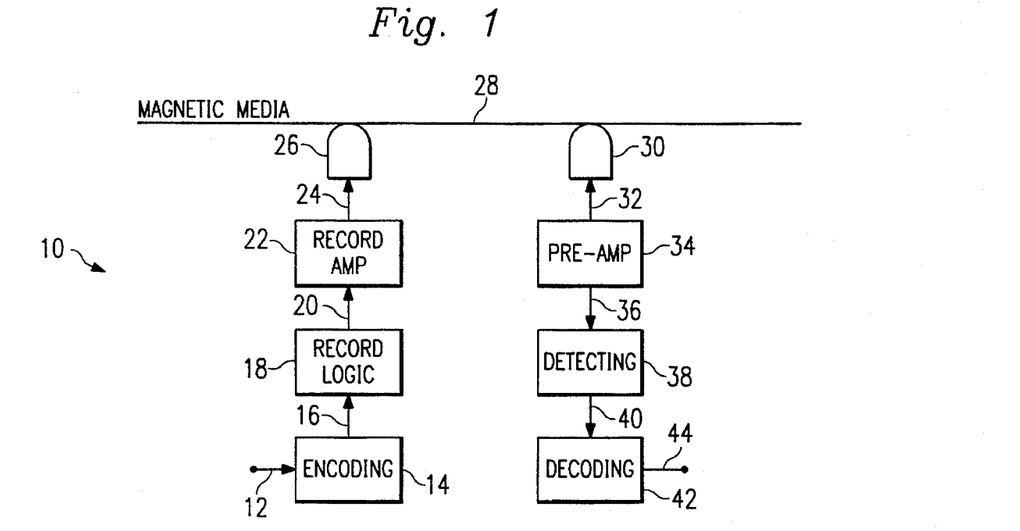
FIG. 1 is a functional block diagram of a preferred embodiment of the ternary magnetic recording and reproduction system.

In FIG. 1, the reference numeral 10 designates a recording system of the present invention which is utilized for recording onto and reproducing from a magnetic medium a binary signal by employing binary-to-ternary convolution coding and a ternary channel on the medium.

Referring to FIG. 1, a binary signal (i.e., a bit stream) on line 12 is input to the encoder 14 which converts, using convolution coding, the binary signal to a ternary signal. The ternary signal is output from the encoder 14, as represented by line 16, to a record logic device 18. In response to the ternary signal, the record logic device 18 generates a positive, negative or oscillating current signal. The current signal is output from the device 18, as represented by line 20, to a conventional record amplifier 22. The record amplifier 22 amplifies the current and outputs the current, as represented by line 24, to a conventional record transducer 26. The record transducer 26 records the current signal onto a conventional digital magnetic storage medium 28 which is used to store the signal. The signal stored on the medium 28 is subsequently reproduced by a reproduce transducer 30 which outputs a voltage signal, as represented by line 32, to a preamplifier 34. The preamplifier 34 amplifies the voltage signal and outputs the amplified signal, as represented by line 36, to a detector 38. The detector 38 converts the amplified voltage signal to a ternary signal and outputs the ternary signal, as represented by line 40, to a decoder 42. The decoder 42 converts the ternary signal to a binary signal and outputs the binary signal onto line 44.

Figure 2:
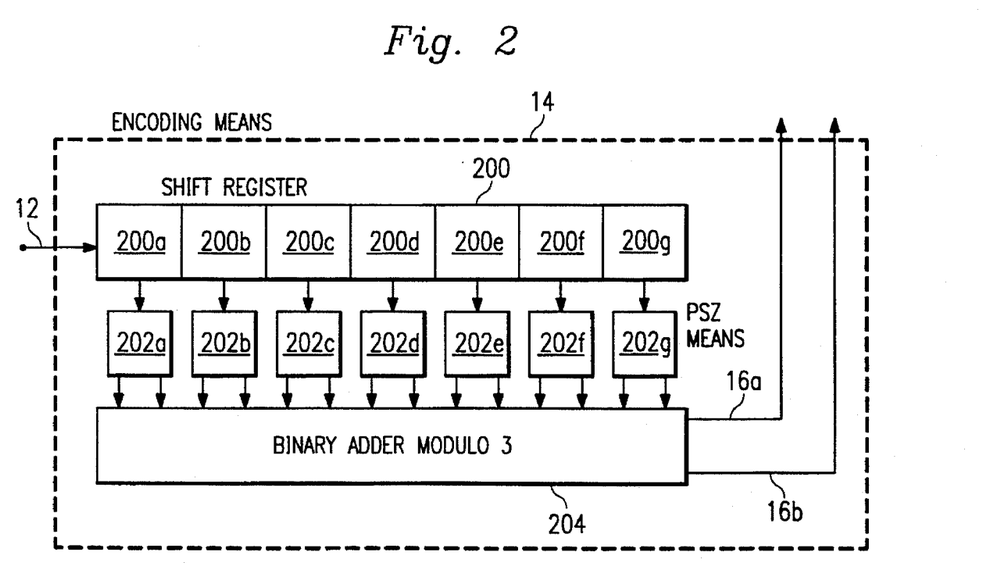
FIG. 2 is a functional block diagram of the binary-to-ternary encoder of FIG. 1.
Figure 3A:
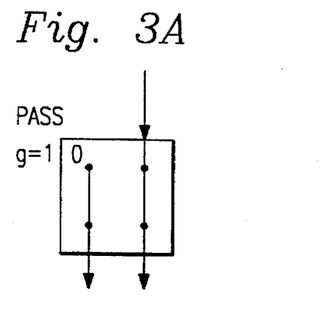
FIG. 3A–3C are conceptual constructs of pass, shift, zero (PSZ) elements of FIG. 2.
Figure 3B:
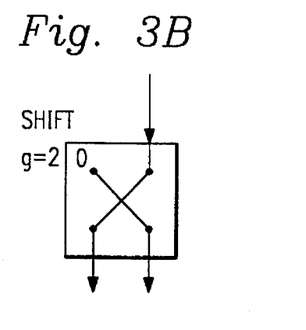
Figure 3C:
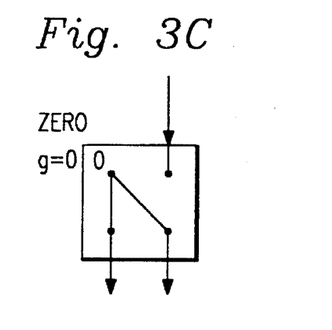

FIGS. 2 and 3A–3C illustrate components of the binary-to-ternary convolutional encoder 14 with a constraint length (K) of seven. Referring to FIG. 2, the encoder 14 comprises a shift register 200, a collection of pass, shift, or zero (PSZ) elements 202, and a binary modulo three adder 204, which adder may be a microprocessor. The register 200 includes seven cells 200a–200g for storing seven bits and is responsive to a clock pulse signal generated by a discrete time clock (not shown). For each clock pulse received, the bits stored in the cells 200a–200f are shifted one cell to cells 200b–200g respectively, one new bit is received from line 12 and stored in cell 200a, and the bit formerly stored in cell 200g is lost. The PSZ collection 202 includes seven elements 202a–202g through which a copy of the contents of the cells 200a–200g is respectively passed in parallel. Referring to FIGS. 3A–3C, each of the elements 202a–202g are individually programmable to operate in a pass, shift, or zero mode. If an element 202a–202g is in the pass mode (FIG. 1), then a 0 or a 1 bit copied from a corresponding cell 200a–200g will be "passed" and a 00 or 01 respectively will be input to the adder 204. In contrast, if an element 202a–202g is in the shift mode (FIG. 3B), then a 0 or a 1 bit copied from a corresponding cell 200a–200g will be "shifted" and a 00 or 10 respectively will be input to the adder 204. If an element 202a–202g is in the zero mode (FIG. 3C), then, regardless of whether the bit in a corresponding cell 200a–200g is a 0 or 1, a 00 will be input to the adder 204. An optimal impulse vector to minimize error in the system 10 is, in decimal, [1, 1, 1, 2, 0, 2, 2]. Referring again to FIG. 2, this vector is implemented by setting the PSZ elements 202a–202g to pass, pass, pass, shift, zero, shift, shift, respectively. Following each shift of the register 200, the adder 204 sums the inputs from the PSZ elements 202a–202g, divides the sum by three, and outputs the remainder (a binary 00, 01, or 10) to lines 16a, 16b. The PSZ elements 202a–202g thus operate to store a ternary impulse response vector, and the adder 204 operates to convolve the ternary impulse response vector with the binary contents of the register 200. As a result, the binary signal input on line 12 is converted to a ternary signal consisting of sequences of bit pairs (representing three symbols) output on lines 16a, 16b.

Figure 4:
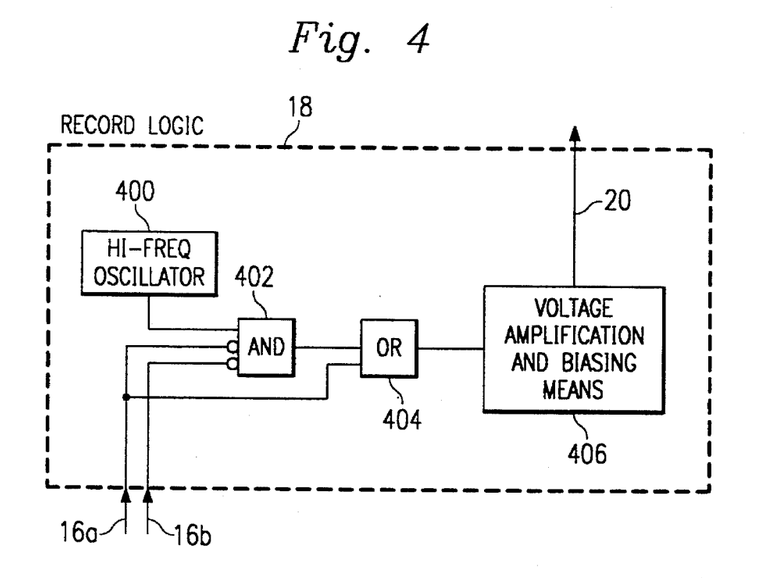
FIG. 4 is a functional block diagram of the record logic device of FIG. 1.

FIG. 4 illustrates the logic operation of the record logic device 18 which comprises a conventional high-frequency oscillator 400, an AND gate 402, an OR gate 404, and a conventional voltage amplifier and bias device 406. The oscillator 400 generates a signal which oscillates, preferably, at four to six times the system clock rate. The AND gate 402 ANDs together the output from the oscillator 400 and the inverted signal on lines 16a, 16b. The OR gate ORs together the output from the AND gate 402 and the signal on line 16a. Thus, if the signal on lines 16a, 16b is, in binary, a 00, 01, or 10, the signal output from the OR gate 402 will be, respectively, an oscillating signal, a low signal, or a high signal. The signal output from the OR gate 402 is input to the device 406 which amplifies and biases the signal so that a high and a low signal will have equal but opposite magnitudes, and may be represented by a +1 and a –1, respectively. The voltage signal generated by the device 406 is output on line 20 to the record amplifier 22.

The record amplifier 22 amplifies the signal on line 20 sufficiently for the record transducer 26 to record the signal onto the magnetic medium 28. The amplifier 22 and transducer 26 may be any of the well-known amplifiers and transducers that are commonly used in magnetic recording systems and more particularly in digital recording systems. When a high (+1) or a low (–1) signal is received by the transducer 26, conventional saturation recording is utilized, whereby a magnetic flux is applied to orient substantially all of the molecules in a particular local region of the medium 28 to one of two opposing magnetically oriented states (polarities). When a zero (oscillating) signal is received by the transducer 26, an oscillating magnetic flux is applied so that the molecules in a particular local region of the medium 28 are randomly oriented and, as a whole, have no particular magnetic orientation; any high or low signal in the local region 28 is thus erased with an oscillating signal. It is understood that information is recorded using the channel states, in contrast to the channel transitions.

Subsequent to the recording of information on the magnetic medium 28, the information may be reproduced using a conventional reproduce transducer 30 and preamplifier 34, both of which are well known in the art and are commonly available. The transducer 30 generates a voltage signal responsive to the magnetic orientations of the medium 28. The preamplifier 34 amplifies the transduced voltage signal generated by the transducer 30 to a suitable amplitude and outputs the signal to line 36.

Figure 6:
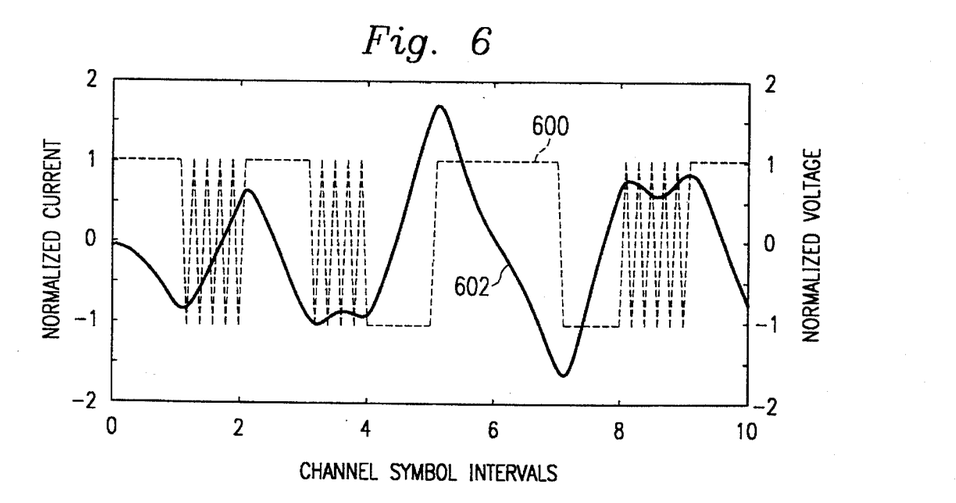
FIG. 6 is a waveform of an exemplary input current signal to and corresponding output voltage signal from the magnetic medium of FIG. 1.

FIG. 6 illustrates, for the channel state sequence (+1, 0, +1, 0, –1, +1, +1, –1, 0, +1), a current waveform 600 written to the medium by the record transducer 26. A corresponding voltage waveform 602 (the smeared derivative of the channel states) read by the reproduce transducer 30 is overlaid on the current waveform 600.

The detector 38, which may employ a microprocessor (not shown), receives and equalizes the voltage signal on line 36 using, preferably, a conventional symbol-by-symbol decision feedback equalization (DFE) algorithm. Using DFE, the voltage signal is sampled and intersymbol interference (ISI, the effect on a particular symbol from nearby symbols) is removed therefrom. As a result, a sequence of substantially ideal sample values is generated and equalized ternary symbols are output from the detector 38 onto line 40. The DFE technique described herein is well known and is commonly available in the art. It is understood that the ternary symbols on line 40, like those on line 16, may be represented by pairs of bits (binary symbols) 00, 01, and 10.

The ternary symbols output from the detector 38 are decoded into binary symbols using the decoder 42, which decoder preferably utilizes a conventional Viterbi algorithm (or one of its reduced state variants). The sequence of binary symbols, being substantially similar to the binary sequence of symbols input onto the line 12, is output onto line 44. It is understood that the decoder 42 may be implemented using a microprocessor (not shown).

The embodiment of the present invention as described herein has many advantages over the prior art, including the utilization of saturation recording for attaining signal to noise ratios and information densities comparable to those attained with conventional binary recording for a given probability of error. A further advantage is that there is no need to space channel symbols apart to allow for doublets, thereby enhancing the information storage density. A still further advantage is that the present invention may be modeled as a linear system and hence information may be recovered using linear equalization which is simpler and less costly than equalization techniques for nonlinear channels. A still further advantage is that rate one convolutional coding may be used while providing the absolute minimum expansion of the code symbol alphabet. A still further advantage is that, because rate one coding is employed, information may be input to and output from the binary-to-ternary encoder and the ternary-to-binary decoder at the same rate, thereby simplifying the control of timing.

It is understood that the present invention can take many forms and embodiments. The embodiments shown herein are intended to illustrate rather than to limit the invention, it being appreciated that variations may be made without departing from the spirit or the scope of the invention. For example, referring to the encoder 14 shown in FIG. 2, the shift register 200, as well as the collection of PSZ elements 202, which store the impulse response vector, may be replaced with other types of storage devices such as random access memory (RAM).

Figure 5:
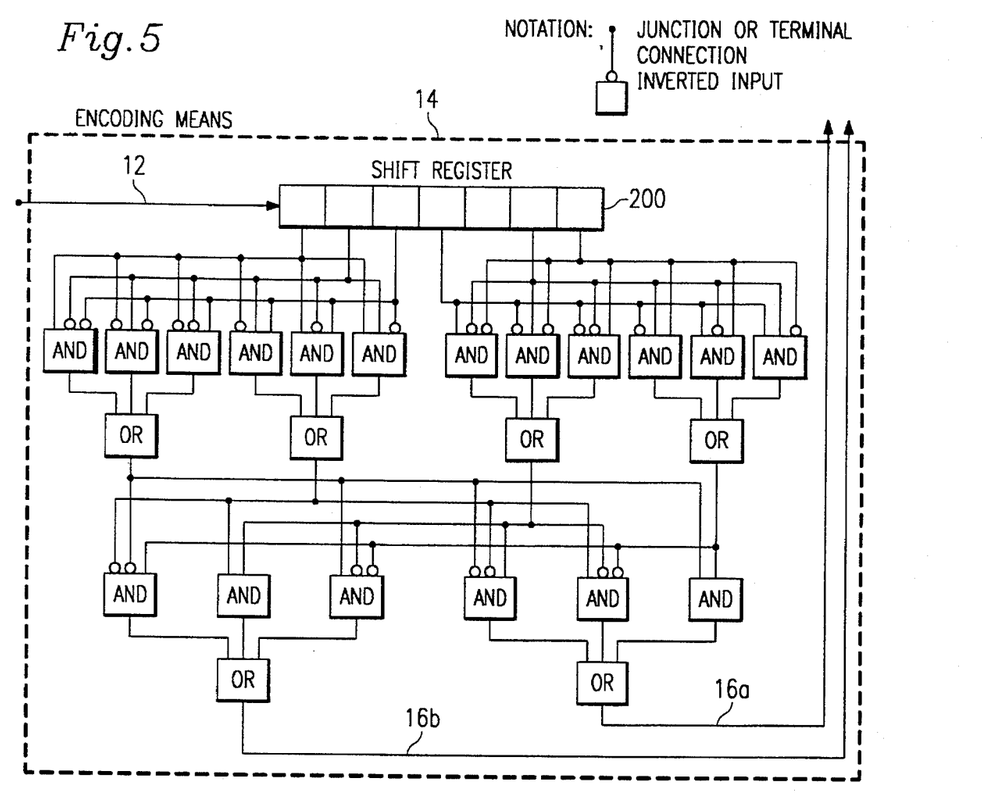
FIG. 5 is an alternate embodiment of the encoder of FIG. 1.

In further embodiments, if the impulse response vector stored in the PSZ elements 200a–200g is known and fixed, then the PSZ elements and the adder 204 may be replaced with logic circuitry as exemplified in FIG. 5. Furthermore, the base three impulse response vector described in the preferred embodiment may be replaced by an impulse response vector of other number bases, such as base four.

Figure 7:
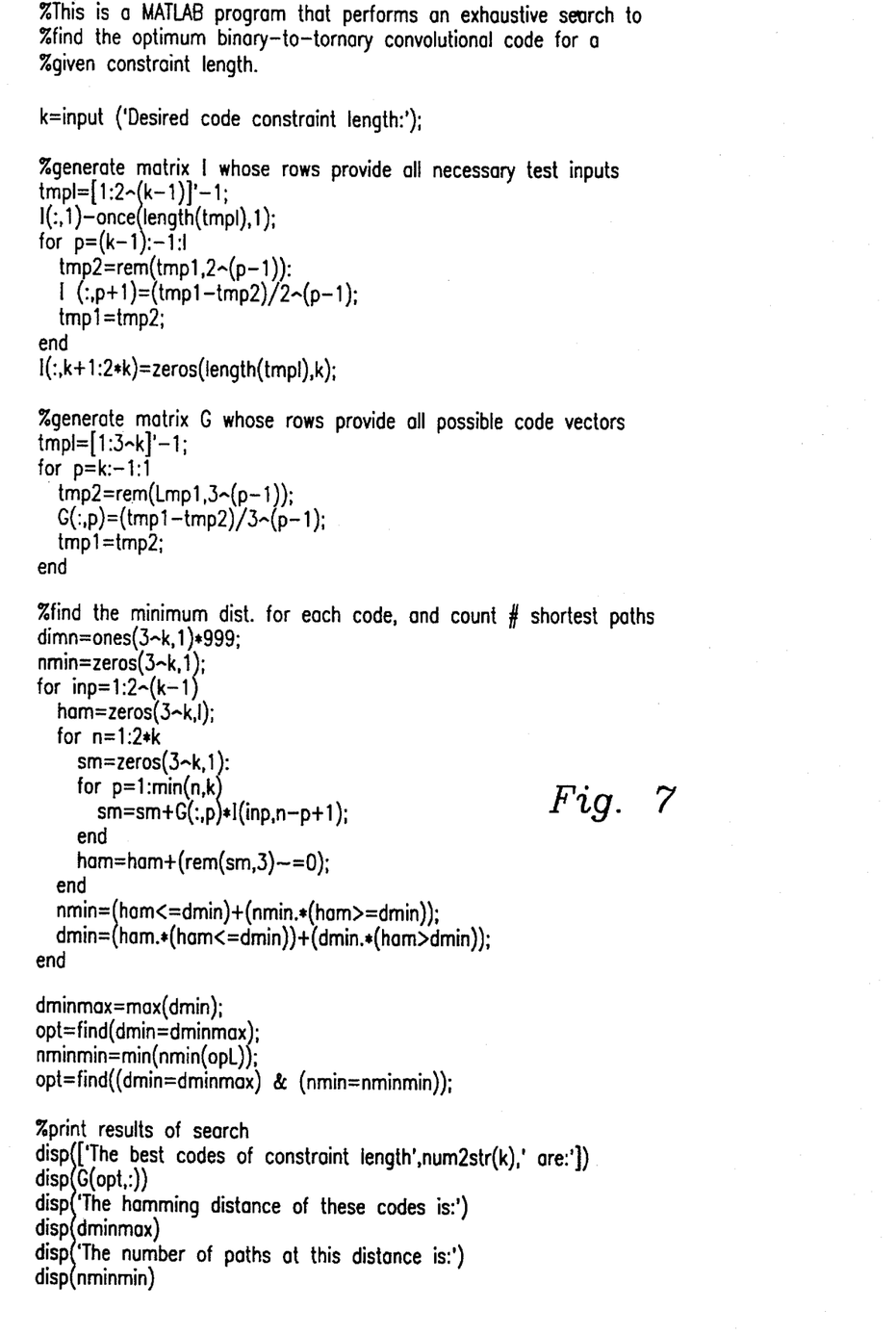
FIG. 7 is a listing of the source code for a computer program used in developing the encoder of FIG. 2.

In still further embodiments, the convolution encoder 14 may be implemented using constraints of lengths K either greater than or less than the length of K=7 disclosed in the preferred embodiment. An impulse response vector, optimized for minimum error, may be derived for a constraint length of K using a computer program as shown in FIG. 7. Such a program exhaustively models and tests all $3^K$ possible vectors by running through a modeled encoder all binary sequences of length 2*K beginning with 1 and ending with K zeros and then measuring the minimum error. The vector resulting in the maximal minimum error is an optimal vector.

In still further embodiments, the symbols may be recorded onto the medium using the transitions between the channel states instead of the states themselves. The DFE algorithms employed by the detector 38 may be replaced by other symbol-by-symbol algorithms such as the well known partial response method or peak detector method to recover the sequence written to the magnetic media. If the peak detector method is employed, an additional encoder must be used to translate or "precode" a sequence of ternary symbols into another ternary sequence whose transitions would represent the information contained in the original symbol sequence. The detector 38 and the decoder 42 may be combined into a single unit to detect and decode sequences, instead of symbols, written to the magnetic media by using a maximum likelihood sequence detector such as the Viterbi detector (or one of its reduced state variants).

In still further embodiments, other forms of data or information may be input on line 12, including such forms as other number bases.

Although illustrative embodiments of the invention have been shown and described, a wide range of modification, change, and substitution is intended in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A method for recording, on a magnetic medium, a stream of bits, which bits represent a first or second binary symbol, the method comprising:

storing an impulse response vector in a first portion of a memory;

inputting said bit stream to a second portion of said memory;

convolving said bit stream with said vector; dividing the results of said convolving by three, outputting thereby a stream of remainders comprising first, second, and third ternary symbols; and for each particular remainder:
determining which ternary symbol said particular remainder is represented by;
upon a determination that said particular remainder is represented by said first or second ternary symbols, causing said medium to have, respectively, a first or second magnetically oriented state; and
upon a determination that said particular remainder is represented by said third symbol, causing said medium to have, substantially, a magnetically nonoriented state.

2. The method of claim 1 wherein said convolving and dividing includes passing said bit stream through an arrangement of logic gates.

3. The method of claim 1 wherein said vector includes a term corresponding to each bit being used to determine a convolution term, and convolving and dividing includes adding, modulo three, said terms corresponding to said bits being convolved, which bits are represented by said first symbols.

4. The method of claim 1 wherein said first and second states are substantially magnetically saturated.

5. The method of claim 4 wherein said first and second states have substantially opposing polarities.

6. The method of claim 1 wherein:

said first and second states are caused by applying to said medium, for a predetermined amount of time, first and second magnetic fluxes respectively, said fluxes having substantially equal magnitudes oriented in substantially opposite directions; and said nonoriented state is caused by applying to said medium, for said predetermined amount of time, a plurality of flux reversals, each reversal including applying said first flux and then applying said second flux.

7. The method of claim 6 wherein said plurality of flux reversals includes at least three flux reversals.

8. The method of claim 6 wherein said fluxes are caused by passing a current through a coil proximal to said medium.

9. The method of claim 6 further comprising:

detecting and equalizing said states; and decoding said states into said binary symbols, thereby reproducing from said medium, said first and second binary symbols.

10. The method of claim 9 wherein said decoding includes using a Viterbi algorithm.

11. A method for recording, on a magnetic medium, a sequence of bits, which bits represent a first or second binary symbol, the method comprising:

storing said sequence of bits in an array of storage cells, one bit per cell;

providing a vector of terms, wherein, for each cell, there is a corresponding term, each of said terms having a first, second, or third numerical value;

summing, modulo three, said terms corresponding to said cells having bits representing said first binary symbols, yielding thereby a first result represented by a first, second, or third ternary symbol;

determining which ternary symbol said first result is represented by;

upon a determination that said first result is represented by said first or second ternary symbols, causing said medium to have, respectively, a first or second magnetically oriented ternary state; and upon a determination that said first result is represented by said third ternary symbol, causing said medium to have, substantially, a magnetically nonoriented ternary state.

12. The method of claim 11 wherein said array of storage cells comprises a first and a last cell, and said method further comprises:

shifting said bits in said cells, other than said first cell, to an adjacent cell closer to said first cell;

storing a new bit representing a first or second binary symbol in said last cell; and summing, modulo three, said terms corresponding to said cells having bits representing said first binary symbols, yielding thereby a second result represented by a first, second, or third ternary symbol.

13. The method of claim 11 wherein said first and second states are substantially magnetically saturated.

14. The method of claim 13 wherein said first and second states have substantially opposing magnetic polarities.

15. The method of claim 11 wherein:

said first and second states are caused by applying to said medium, for a predetermined amount of time, first and second magnetic fluxes respectively, said fluxes having substantially equal magnitudes oriented in substantially opposite directions; and said nonoriented state is caused by applying to said medium, for said predetermined amount of time, a plurality of flux reversals, each reversal including the application of said first flux and then the application of said second flux.

16. The method of claim 15 wherein said plurality of flux reversals includes at least three flux reversals.

17. The method of claim 15 wherein said first and second fluxes are caused by passing, respectively, a positive and negative current through a coil proximal to said medium.

18. The method of claim 11 further comprising:

detecting and equalizing said states; and decoding said states into said binary symbols, thereby reproducing from said medium, said first and second binary symbols.

19. The method of claim 18 wherein said decoding includes using a Viterbi algorithm.

20. The method of claim 18 wherein said detecting and equalizing includes utilizing partial response equalization.

21. The method of claim 18 wherein said detecting and equalizing includes precoding and utilizing peak detection equalization.

22. The method of claim 18 wherein said detecting and equalizing includes utilizing decision feedback equalization.

23. A method for recording, on a magnetic medium, first, second, and third symbols, the method comprising:

representing said first symbol by causing said medium to have a first magnetic orientation;

representing said second symbol by causing said medium to have a second magnetic orientation;

representing said third symbol by causing said medium to have a substantially nonmagnetic orientation;

wherein:

said first and second magnetic orientations are caused by applying to said medium, for a predetermined amount of time, first and second magnetic fluxes respectively, said fluxes having substantially equal magnitudes oriented in substantially opposite directions; and said nonmagnetic orientation is caused by applying to said medium, for said predetermined amount of time, a plurality of flux reversals, each reversal including applying said first flux and then applying said second flux.

24. The method of claim 23 wherein said plurality of flux reversals includes at least three flux reversals.

25. The method of claim 23 wherein said first and second fluxes are caused by passing, respectively, a positive and negative current through a coil proximal to said medium.

26. The method of claim 23 further comprising:

detecting and equalizing said orientations; and decoding said orientations into said binary symbols, thereby reproducing from said medium, said first and second binary symbols.

27. An apparatus for recording, onto a magnetic medium, a stream of bits, which bits represent a first or second binary symbol, the apparatus comprising:

means for convolving said bit stream with an impulse response vector, yielding a stream of convolution results;

means receptive to said results for dividing each of said results by three and generating a stream of remainders, which remainders are represented by first, second, and third ternary symbols; and means responsive to said convolving and dividing means for recording said first, second, or third ternary symbols by causing said medium to have, respectively, a first or second magnetically oriented state, or a substantially magnetically nonoriented state.

28. The apparatus of claim 27, wherein said convolving means and said dividing means are integrated into an arrangement of logic gates.

29. The apparatus of claim 27, wherein said convolving means and said dividing means are integrated into a microprocessor.

30. An apparatus for recording, onto a magnetic medium, a stream of bits, which bits represent a first or second binary symbol, the apparatus comprising:

means for encoding said bit stream as a ternary stream of first, second and third ternary symbols;

means for determining which of said ternary symbols has been encoded;

first means, responsive to a determination that said first or second ternary symbol has been encoded, for recording said respective first or second ternary symbol by causing said medium to have, respectively, a first or second magnetically oriented ternary state;

second means, responsive to a determination that said third ternary symbol has been encoded, for recording said third ternary symbol by causing said medium to have, substantially, a magnetically nonoriented ternary state;

wherein:

said first means causes said first and second states by applying to said medium, for a predetermined amount of time, first and second magnetic fluxes respectively, said fluxes having substantially equal magnitudes oriented in substantially opposite directions; and said second means causes said nonoriented state by applying to said medium, for said predetermined amount of time, a plurality of flux reversals, each reversal including the application of said first flux and then the application of said second flux.

31. The apparatus of claim 30 wherein said plurality of flux reversals includes at least three flux reversals.

32. The apparatus of claim 30 wherein said first and second means causes said first and second fluxes by passing, respectively, a positive and negative current through a coil proximal to said medium.

33. An apparatus for recording, onto a magnetic medium, a stream of bits, which bits represent a first or second binary symbol, the apparatus comprising:

means for encoding said bit stream as a ternary stream of first, second and third ternary symbols;

means for determining which of said ternary symbols has been encoded;

first means, responsive to a determination that said first or second ternary symbol has been encoded, for recording said respective first or second ternary symbol by causing said medium to have, respectively, a first or second magnetically oriented ternary state;

second means, responsive to a determination that said third ternary symbol has been encoded, for recording said third ternary symbol by causing said medium to have, substantially, a magnetically nonoriented ternary state;

an arrangement of logic gates;

a high-frequency signal oscillator connected to said arrangement; and wherein said determining means, said first means, and said second means are integrated into said arrangement of logic gates.

34. An apparatus for recording, onto a magnetic medium, a stream of bits, which bits represent a first or second binary symbol, the apparatus comprising:

means for encoding said bit stream as a ternary stream of first, second and third ternary symbols;

means for determining which of said ternary symbols has been encoded;

first means, responsive to a determination that said first or second ternary symbol has been encoded, for recording said respective first or second ternary symbol by causing said medium to have, respectively, a first or second magnetically oriented ternary state;

second means, responsive to a determination that said third ternary symbol has been encoded, for recording said third ternary symbol by causing said medium to have, substantially, a magnetically nonoriented ternary state;

a microprocessor;

a high-frequency signal oscillator connected to said microprocessor; and wherein said determining means, said first means, and said second means are integrated into said microprocessor.

35. An apparatus for recording a first symbol, a second symbol, or a third symbol, the apparatus comprising:

means for determining which of said ternary symbols is to be recorded;

first means, responsive to a determination that said first or second symbols are to be recorded, for causing said medium to have, respectively, a first or second magnetically oriented ternary state;

second means, responsive to a determination that said third symbol is to be recorded, for causing said medium to have, substantially, a magnetically nonoriented ternary state;

wherein:

said first means causes said first and second states by applying to said medium, for a predetermined amount of time, first and second magnetic fluxes respectively, said fluxes having substantially equal magnitudes oriented in substantially opposite directions; and said second means causes said nonoriented state by applying to said medium, for said predetermined amount of time, a plurality of flux reversals, each reversal including the application of said first flux and then the application of said second flux.

36. The apparatus of claim 35 wherein said plurality of flux reversals includes at least three flux reversals.

37. The apparatus of claim 35 wherein said first and second means causes said first and second fluxes by passing, respectively, a positive and negative current through a coil proximal to said medium.

38. An apparatus for recording a first symbol, a second symbol, or a third symbol, the apparatus comprising:

means for determining which of said ternary symbols is to be recorded;

first means, responsive to a determination that said first or second symbols are to be recorded, for causing said medium to have, respectively, a first or second magnetically oriented ternary state;

second means, responsive to a determination that said third symbol is to be recorded, for causing said medium to have, substantially, a magnetically nonoriented ternary state;

a microprocessor;

a high-frequency signal oscillator connected to said microprocessor; and wherein said determining means, said first means, and said second means are integrated into said microprocessor.

39. An apparatus for recording a first symbol, a second symbol, or a third symbols the apparatus comprising:

means for determining which of said ternary symbols is to be recorded;

first means, responsive to a determination that said first or second symbols are to be recorded, for causing said medium to have, respectively, a first or second magnetically oriented ternary state;

second means, responsive to a determination that said third symbol is to be recorded, for causing said medium to have, substantially, a magnetically nonoriented ternary state;

an assembly of logic gates;

a high-frequency signal oscillator connected to said assembly; and wherein said determining means, said first means, and said second means are integrated into said assembly.

40. A method for recording, on a magnetic medium, a stream of bits, which bits represent a first or second binary symbol, the method comprising:

storing an impulse response vector in a first portion of a memory;

inputting said bit stream to a second portion of said memory;

convolving said bit stream with said vector;

dividing the results of said convolving by three, outputting thereby a stream of remainders comprising first, second, and third ternary symbols; and for each particular remainder:
  determining which ternary symbol said particular remainder is represented by;
  upon a determination termination that said particular remainder is represented by said first or second ternary symbols, applying to said medium, for a predetermined amount of time, first and second magnetic fluxes respectively, said fluxes having substantially equal magnitudes oriented in substantially opposite directions, so that said medium has respectively, a first or second magnetically oriented state; and
  upon a determination that said particular remainder is represented by said third symbol, applying to said medium, for said predetermined amount of time, a plurality of flux reversals, each reversal including applying said first flux and then applying said second flux so that said medium has, substantially, a magnetically nonoriented state.

41. A method for recording, on a magnetic medium, first, second, and third symbols, the method comprising:
  representing said first symbol by applying to said medium, for a predetermined amount of time, a first magnetic flux, so that said medium is caused to have a first magnetic orientation;
  representing said second symbol by applying to said medium, for a predetermined amount of time, a second magnetic flux, so that said medium is caused to have a second magnetic orientation;
  wherein said first and second magnetic fluxes have substantially equal magnitudes oriented in substantially opposite directions; and
  representing said third symbol by applying to said medium, for said predetermined amount of time, a plurality of flux reversals, each reversal including applying said first flux and then applying said second flux, so that said medium is caused to have a substantially nonmagnetic orientation.

42. An apparatus for recording, onto a magnetic medium, a stream of bits, which bits represent a first or second binary symbol, the apparatus comprising:
  means for convolving said bit scream with an impulse response vector, yielding a stream of convolution results;
  means receptive to said results for dividing each of said results by three and generating a stream of remainders, which remainders are represented by first, second, and third ternary terms; and
  means for recording said first, second, and third ternary terms as respective first, second, and third ternary symbols by causing said medium to have, respectively, a first or second magnetically oriented state, or a substantially magnetically nonoriented state.

43. An apparatus for recording, onto a magnetic medium, a stream of bits, which bits represent a first or second binary symbol, the apparatus comprising:
  an array of cells;
  first means for storing a portion of said bit stream in said array of cells, one bit per cell;
  an array of elements having a combination of first, second, and third numerically valued terms representing an impulse response vector, and wherein, for each cell, there is a corresponding term;
  means for adding, modulo three, said terms corresponding to said cells having bits representing said first binary symbols, yielding thereby a first result represented by a first, second, or third ternary symbol; and
  means for recording said first, second, or third ternary symbols by causing said medium to have, respectively, a first or second magnetically oriented state, or a substantially magnetically nonoriented state.

44. The apparatus of claim 43 wherein said array of cells comprises a first and a last cell, and said apparatus further comprises:
  means for shifting said bits in said cells, other than said first cell, to an adjacent cell closer to said first cell;
  second means for storing a new bit from said bit stream in said last cell; and
  means for adding, modulo three, said terms corresponding to said cells having bits representing said first binary symbols, yielding thereby a second result represented by a first, second, or third ternary symbol.

45. The apparatus of claim 44 wherein said array of cells is a register.

46. The apparatus of claim 44 wherein said array of cells is a shift register.

47. The apparatus of claim 44 wherein said array of cells is random access memory.

48. The apparatus of claim 43 wherein said adding means is a microprocessor.

49. The apparatus of claim 43 wherein said adding means is an assembly of logic gates.

50. The apparatus of claim 43 wherein said recording means further comprises:
  means for determining which of said ternary symbols is to be recorded;
  first means, responsive to a determination that said first or second ternary symbols is to be recorded, for causing said medium to have, respectively, a first or second magnetically oriented ternary state; and
  second means, responsive to a determination that said third ternary symbol is to be recorded, for causing said medium to have, substantially, a magnetically nonoriented ternary state.

51. The apparatus of claim 50 wherein:
  said first mean causes said first and second states by applying to said medium, for a predetermined amount of time, first and second magnetic fluxes respectively, said fluxes having substantially equal magnitudes oriented in substantially opposite directions; and
  said second means causes said nonoriented state by applying to said medium, for said predetermined amount of time, a plurality of flux reversals, each reversal including the application of said first flux and then the application of said second flux.

52. The apparatus of claim 51 wherein said plurality of flux reversals includes at least three flux reversals.

53. The apparatus of claim 51 wherein said first and second means causes said first and second fluxes by passing, respectively, a positive and negative current through a coil proximal to said medium.

54. The apparatus of claim 50, further comprising:
  an arrangement of logic gates;
  a high-frequency signal oscillator connected to said arrangement; and
  wherein said determining means, said first means, and said second means are integrated into said arrangement of logic gates.

55. The apparatus of claim 50, further comprising:
  a microprocessor;

a high-frequency signal oscillator connected to said microprocessor; and wherein said determining means, said first means, and said second means are integrated into said microprocessor.

56. An apparatus for recording a first symbol, a second symbol, or a third symbol, the apparatus comprising:

means for determining which of said symbols is to be recorded;

first means, responsive to a determination that said first or second symbols are to be recorded, for applying to said medium, for a predetermined amount of time, first and second magnetic fluxes respectively, said fluxes having substantially equal magnitudes oriented in substantially opposite directions, so that said medium has, respectively, a first or second magnetically oriented state; and second means, responsive to a determination that said third symbol is to be recorded, for applying to said medium, for said predetermined amount of time, a plurality of flux reversals, each reversal including the application of said first flux and then the application of said second flux, so that said medium has, substantially, a magnetically nonoriented state.

57. The apparatus of claim 56 wherein said plurality of flux reversals includes at least three flux reversals.

58. The apparatus of claim 56 wherein said first and second means causes said first and second fluxes by passing, respectively, a positive and negative current through a coil proximal to said medium.

59. An apparatus for recording a first symbol, a second symbol, or a third symbol, the apparatus comprising:

a microprocessor;

means, integrated into said microprocessor, for determining which of said symbols is to be recorded;

first means, integrated into said microprocessor, responsive to a determination that said first or second symbols are to be recorded, for causing said medium to have, respectively, a first or second magnetically oriented state;

a high-frequency signal oscillator, operatively connected to said microprocessor;

second means, integrated into said microprocessor, responsive to a determination that said third symbol is to be recorded, for activating said oscillator to cause said medium to have, substantially, a magnetically nonoriented state.

60. An apparatus for recording a first symbol, a second symbol, or a third symbol, the apparatus comprising:

an assembly of logic gates means, integrated into said assembly of logic gates, for determining which of said symbols is to be recorded;

first means, integrated into said assembly of logic gates, responsive to a determination that said first or second symbols are to be recorded, for causing said medium to have, respectively, a first or second magnetically oriented state;

a high-frequency signal oscillator, operatively connected to said assembly of logic gates;

second means, integrated into said assembly of logic gates, responsive to a determination that said third symbol is to be recorded, for activating said oscillator to cause said medium to have, substantially, a magnetically nonoriented state.

* * * * *